US012663757B2

(12) United States Patent
Christan

(10) Patent No.: US 12,663,757 B2
(45) Date of Patent: *Jun. 23, 2026

(54) TIMEPIECE REGULATING MEMBER COMPRISING AN INDEX-ASSEMBLY SYSTEM PROVIDED WITH LOCKING MEANS

(71) Applicant: ETA SA Manufacture Horlogère Suisse, Grenchen (CH)

(72) Inventor: Julien Christan, Bienne (CH)

(73) Assignee: ETA SA Manufacture Horlogère Suisse, Grenchen (CH)

(*) Notice: Subject to any disclaimer, the term of this patent is extended or adjusted under 35 U.S.C. 154(b) by 420 days.

This patent is subject to a terminal disclaimer.

(21) Appl. No.: 18/315,523

(22) Filed: May 11, 2023

(65) Prior Publication Data

US 2023/0393526 A1 Dec. 7, 2023

(30) Foreign Application Priority Data

Jun. 2, 2022 (EP) ..................................... 22177059
Dec. 21, 2022 (EP) ..................................... 22215645
Apr. 11, 2023 (EP) ..................................... 23167376

(51) Int. Cl.
*G04B 17/06* (2006.01)
*G04B 17/34* (2006.01)
(Continued)

(52) U.S. Cl.
CPC ........... *G04B 17/063* (2013.01); *G04B 17/34* (2013.01); *G04B 18/006* (2013.01); *G04B 18/026* (2013.01)

(58) Field of Classification Search
CPC ................................ G04B 18/06; G04B 18/08
See application file for complete search history.

(56) References Cited

U.S. PATENT DOCUMENTS

2006/0187763 A1* 8/2006 Jujo ...................... G04B 18/00 368/170
2014/0160897 A1 6/2014 Gabathuler et al.
(Continued)

FOREIGN PATENT DOCUMENTS

CH 521 620 A 12/1971
CH 714 791 A1 9/2019
(Continued)

OTHER PUBLICATIONS

European Search Report issued Oct. 5, 2023, in corresponding European Patent Application No. 23 16 7376 (with English Translation of Category of Cited Documents), 3 pages.
(Continued)

*Primary Examiner* — Renee S Luebke
*Assistant Examiner* — Matthew Daniel Hwang
(74) *Attorney, Agent, or Firm* — Oblon, McClelland, Maier & Neustadt, L.L.P.

(57) ABSTRACT

A regulating member for a horological movement including an inertial mass, for example a balance, a balance spring, and an index-assembly system for adjusting the rate of the balance spring, the index-assembly system including a stud-holder including a first portion and a second portion, the first portion being movable relative to the second portion, wherein the regulating member includes locking device configured to block the second portion of the stud-holder in one position with respect to a plate of the movement.

15 Claims, 4 Drawing Sheets

(51) Int. Cl.
*G04B 18/00* (2006.01)
*G04B 18/02* (2006.01)

(56) References Cited

U.S. PATENT DOCUMENTS

| | | | | |
|---|---|---|---|---|
| 2014/0286145 | A1* | 9/2014 | Stranczl | G04B 29/04 368/300 |
| 2019/0187618 | A1* | 6/2019 | Bravo | G04B 17/063 |
| 2020/0319596 | A1 | 10/2020 | Halter | |
| 2022/0171335 | A1* | 6/2022 | Le Moal | G04B 17/066 |
| 2022/0171336 | A1* | 6/2022 | Kahrobaiyan | G04B 18/06 |

FOREIGN PATENT DOCUMENTS

| | | | |
|---|---|---|---|
| CH | 716 084 | A2 | 10/2020 |
| CH | 717 088 | A2 | 7/2021 |
| GB | 927464 | A | 5/1963 |
| JP | 48-11335 | | 3/1973 |
| JP | 2004-286744 | A | 10/2004 |

OTHER PUBLICATIONS

Japanese Office Action issued on Jun. 11, 2024 in Japanese Patent Application No. 2023-088507 (with unedited computer-generated English translation), 10 pages.

Korean Notice of Grounds for Rejection issued Feb. 5, 2025 in Korean Patent Application No. 10-2023-0070362 (with English Translation), 11 pages.

* cited by examiner

TIMEPIECE REGULATING MEMBER COMPRISING AN INDEX-ASSEMBLY SYSTEM PROVIDED WITH LOCKING MEANS

CROSS-REFERENCE TO RELATED APPLICATIONS

This application claims priority to European Patent Application No. 22177059.7 filed Jun. 2, 2022, European Patent Application No. 22215645.7 filed Dec. 21, 2022 and European Application No. 23167376.5 filed Apr. 11, 2023, the entire disclosures of which are hereby incorporated herein by reference.

TECHNICAL FIELD OF THE INVENTION

The invention relates to the field of horology, and more particularly to the field of mechanical horology, where the motive energy is regulated by a regulating member. More specifically, the invention relates to a regulating member provided with a precision index-assembly system, a horological movement comprising such a regulating member, as well as a timepiece comprising such a horological movement.

TECHNOLOGICAL BACKGROUND

In most mechanical watches, the energy required to rotate the hands (for example the minute and hour hands) is stored in a barrel and then delivered by a sprung balance system, which comprises a flywheel referred to as a balance, associated with a spring in the form of a spirally-coiled strip, referred to as a balance spring.

At an inner end, the balance spring is fastened on a shaft secured in rotation with the balance; at an outer end, the balance spring is fastened on a stud mounted on a stud-holder which is itself secured to a fixed bridge (or corck).

The rotation of the balance is maintained—and its oscillations counted—by an escapement mechanism comprising a pallet-lever caused to move by an oscillating motion of low amplitude, provided with two pallet-stones which act against the teeth of an escape wheel. Thus impacted, the escape wheel is given a step-by-step rotational motion, the frequency whereof is determined by the frequency of oscillation of the pallet-lever, which is itself set to the frequency of oscillation of the sprung balance.

In a conventional escapement mechanism, the oscillation frequency is about 4 Hz, or about 28,800 vibrations per hour (vph). One goal of good watchmakers is to guarantee the isochronism and regularity of the oscillations (or constancy of rate) of the balance.

The rate of the balance is regulated in a known manner by adjusting the active length of the balance spring, defined as the curvilinear length between its inner end and a count point, located in the vicinity of the outer end of the balance spring and typically defined by a pair of bankings carried by a key mounted on an index-assembly system.

During operation, this index-assembly system is fixed such that it rotates relative to the axis of the balance spring. However, the angular position can be finely adjusted by manual intervention, for example by using a screwdriver to pivot an eccentric, which acts like a cam on the index-assembly system.

The set comprising the bridge, the index-assembly system, the key, the stud-holder, the balance spring and the balance, is commonly called "regulating member".

Examples of regulating members are proposed by the European patent EP3304215 and by the European patent EP 2 876 504, both filed by the watchmaker ETA.

Index-assembly systems including a stud-holder exist, to which one end of the balance spring is fastened, and where the index-assembly system key leaves a backlash to enable the balance spring to move between the two bankings. However, the chronometric properties, in particular the anisochronism, are very sensitive to the backlash of the index-assembly key, while this backlash is difficult to control accurately.

In some devices, the bankings can be adjusted to squeeze the balance spring and thus eliminate the play, in particular during operation of the balance spring. In such a case, the rate is firstly regulated by moving the index key, after which the balance spring is squeezed against the key. However, squeezing the balance spring against the index key can place it under strain and create chronometric defects, in particular by decentering the turns. Moreover, removing the play also changes the rate, and once the balance spring has been squeezed, the index key can no longer be moved along the balance spring to finish finely regulating the rate.

Other balance springs include an integrated regulator device. In these balance springs, the rate is not regulated by changing the effective length of the balance spring, but by applying a force or torque to a resilient element arranged in series with the balance spring. The rigidity of the resilient element and thus of the balance spring as a whole can thus be changed. The adjustment of the rigidity of the balance spring allows the rate of the regulating member to be regulated. Such a balance spring with a resilient element is, for example, described in the patent application EP4009115.

However, in such cases, the typical index-assembly systems cannot be used, as they are not compatible with the balance spring regulator device. Moreover, as the rate is very finely regulated, it is essential that there is no play between the balance spring and its areas of interaction with the index-assembly. This is because, conversely, there would be a risk of altering the rate in the event of an impact, if the balance spring does not reposition itself in exactly the same way after the impact.

Furthermore, it is necessary to be able to set the rate of the regulating member, without changing the reference. Indeed, when mounting the regulating member in the movement, the reference is set so that the balance properly cooperates with the pallet-lever. Once the reference is set, it is desired to avoid disrupting setting thereof, in particular when adjusting the rate of the regulating member.

SUMMARY OF THE INVENTION

The purpose of the present invention is to overcome some or all of the aforementioned drawbacks by providing an index-assembly system that is compatible with this type of regulator device.

To this end, the invention relates to a regulating member for a horological movement comprising an inertial mass, for example a balance, a balance spring, and an index-assembly system for adjusting the rate of the balance spring, the index-assembly system comprising a stud-holder comprising a first portion and a second portion, the first portion being movable relative to the second portion to be able to set the rate of the regulating member.

The invention is remarkable in that the regulating member comprises locking means configured to block the second portion of the stud-holder in one position with respect to a plate of the movement.

Thanks to the invention, it is possible to lock the second portion of the stud-holder after setting of the reference, and thus avoid disrupt setting thereof, for example when the first portion is actuated to adjust the rate of the regulating member.

According to a particular embodiment of the invention, the locking means comprise an eccentric mounted on a balance bridge of the regulating member.

According to a particular embodiment of the invention, the second portion comprises a protrusion having a circle-arc shape cooperating with the eccentric.

According to a particular embodiment of the invention, the locking means comprise a locking plate and a locking screw for assembling the locking plate on the second portion and locking its position.

According to a particular embodiment of the invention, the locking plate has a shape cooperating on one side with a balance bridge of the regulating member, and on the other side with a bearing of the regulating member to block the second portion.

According to a particular embodiment of the invention, the locking screw is arranged so as to cross the locking plate to be screwed in a balance bridge of the regulating member.

According to a particular embodiment of the invention, the index-assembly system comprises a spring, exerting a force between the first portion and the second portion to hold the arm of the first portion against the cam.

According to a particular embodiment of the invention, the balance spring comprises a coiled strip and means for adjusting the rigidity of the balance spring fitted with a resilient element arranged in series with the coiled strip, the stud-holder being mechanically linked to the resilient element.

According to a particular embodiment of the invention, the adjustment means comprise prestressing means for applying a variable force or torque on the flexible element.

According to a particular embodiment of the invention, the first portion includes a first stud and the second portion a second stud, the resilient element and the prestressing means being arranged between the first stud and the second stud, the first stud being movable relative to the second stud to actuate the prestressing means, the movement of the first stud modifying the rigidity of the balance spring.

According to one specific embodiment of the invention, the prestressing means include a lever connected to the flexible element, the first stud being integral with a free end of the lever.

According to a particular embodiment of the invention, the prestressing means include a semi-rigid structure arranged parallel to the flexible element, the lever being connected to the semi-rigid structure.

According to a particular embodiment of the invention, the flexible element is connected to a rigid support, the second stud being secured to the rigid support.

According to a particular embodiment of the invention, the first portion and the second portion are superimposed.

According to a particular embodiment of the invention, the first portion is capable of moving in rotation relative to the second portion.

The invention further relates to a horological movement comprising such a regulating member.

The invention further relates to a timepiece, for example a watch, comprising such a horological movement.

BRIEF DESCRIPTION OF THE FIGURES

The aims, advantages and features of the present invention will appear upon reading several embodiments given only as non-limiting examples, with reference to the appended drawings wherein.

DETAILED DESCRIPTION OF THE INVENTION

Figure 1:
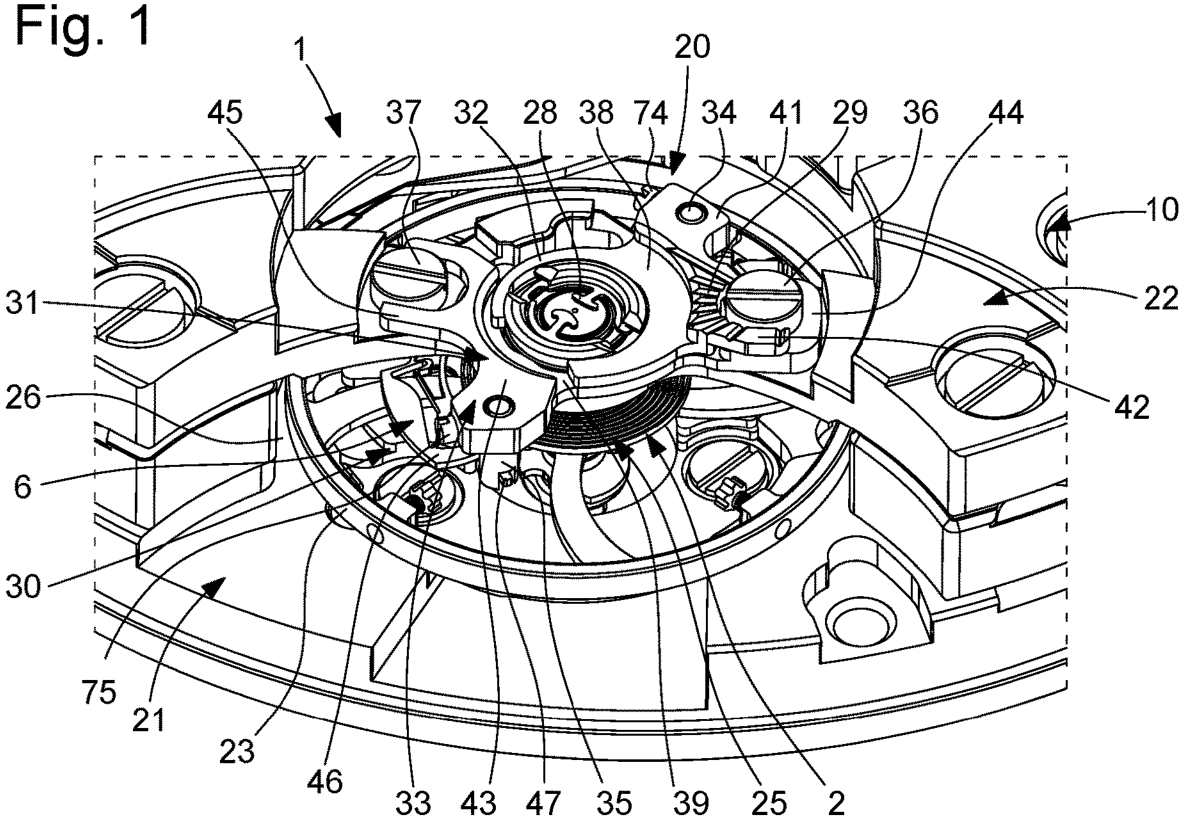
FIG. 1 schematically represents a perspective view of a regulating member according to an embodiment of the invention, the regulating member being arranged in a horological movement, FIG. 2 schematically represents a perspective view of a portion of the first embodiment of the regulating member in FIG. 1, without the balance bridge and without the index-assembly system, FIG. 3 schematically represents a top view of a balance spring of the regulating member, FIG. 4 schematically represents a perspective view of a portion of a regulating member according to a second embodiment of the invention, the regulating member being arranged in a horological movement, FIG. 5 schematically represents a perspective view of the second embodiment of the regulating member in FIG. 4, FIG. 6 schematically represents a perspective view of a variant of the stud-holder of the second embodiment, FIG. 7 schematically represents a perspective view of the second portion of the stud-holder of the variant of FIG. 6, and FIG. 8 schematically represents a perspective view of the second portion of the stud-holder mounted on a balance bridge.
Figure 2:
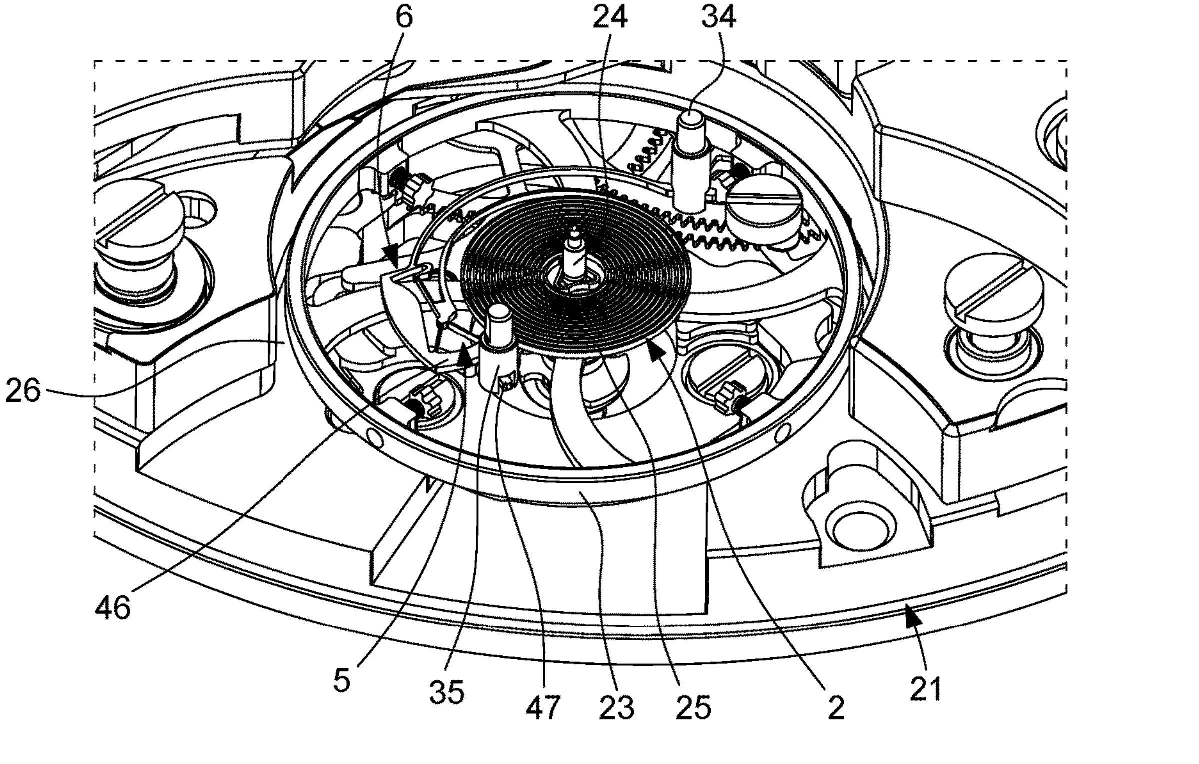

FIGS. 1 and 2 show a diagrammatic view of a first embodiment of a regulating member 1 arranged inside a horological movement 10. The horological movement 10 comprises a plate 21, a regulating member provided with an inertial mass, and a resilient biasing element of the inertial mass configured to make it oscillate.

The regulating member 1 further comprises an index-assembly system 20, an annular balance 23 as an inertial mass, a balance shaft 24, a balance spring 25 as a resilient biasing element, and a balance bridge 22.

The plate 21 is provided with a recess 26 for receiving the regulating member 1, inside which the balance 23, the balance spring 25, the balance bridge 22 and the index-assembly system 20 are superimposed from the bottom upwards.

The balance staff 24 is centred inside the recess 26 and passes through the centre of the balance 23, of the balance spring 25 and of the balance bridge 22. The balance staff 24 is held by two shockproof bearings 28 arranged at the two ends of the balance staff 24. A first bearing is arranged at the bottom of the recess 26, and the second bearing 28 is arranged above the recess 26, and is held by the balance bridge 22, the balance bridge 22 passing through the top of the recess 26 through the central axis of the recess 26. The balance bridge 22 has a hole, herein a through-hole, inside which the second bearing 28 is held. The index-assembly system 20 is mounted on the balance bridge 22 and is disposed, in this embodiment, along the central axis of the recess 26.

Figure 3:
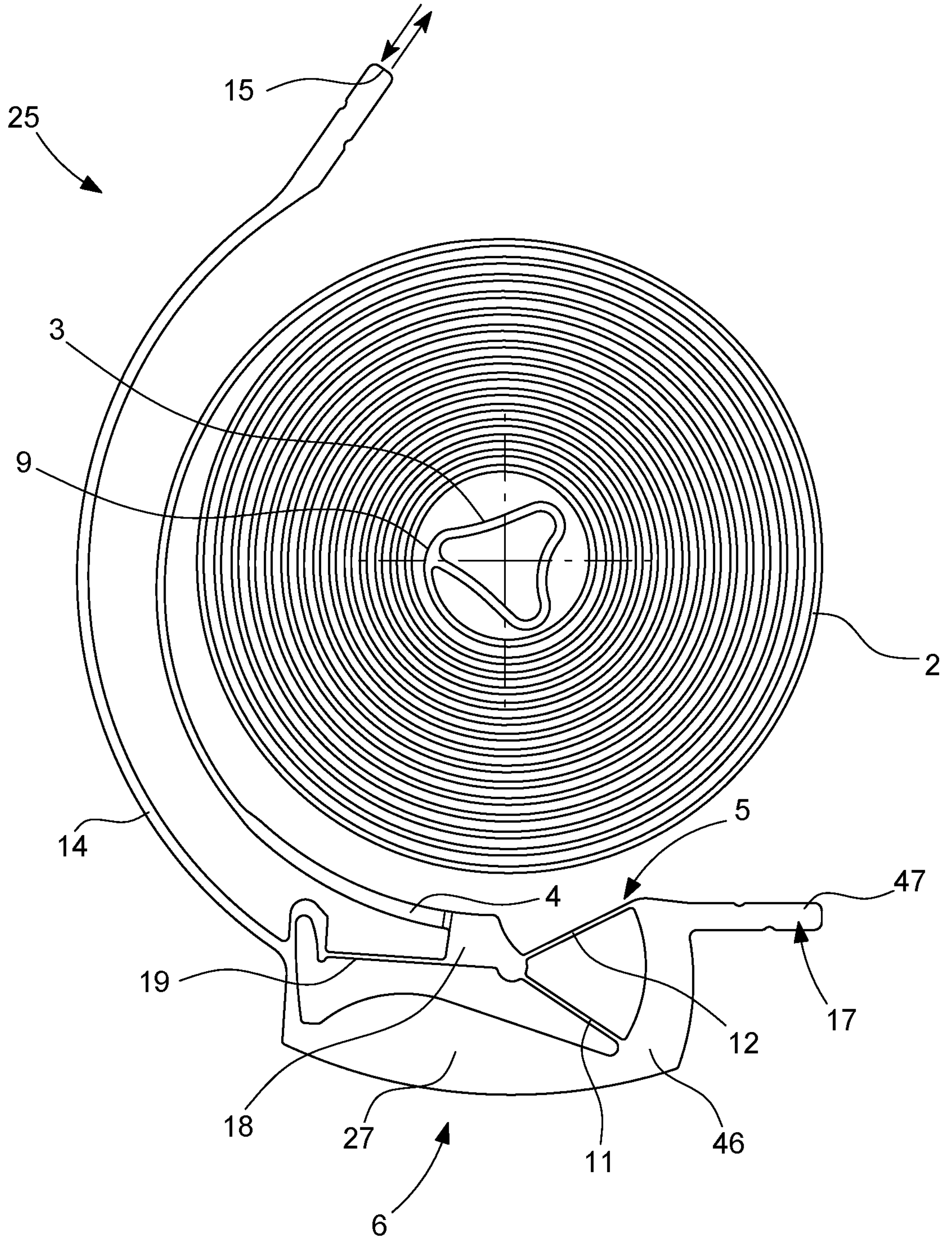

As shown in FIGS. 2 and 3, the balance spring 25 preferably extends substantially in one plane. The balance spring 25 comprises a flexible strip 2 coiled on itself in several turns, the strip 2 having a predefined rigidity. The inner end 9 of the strip 2 is formed integrally in one piece with or assembled with a support 3, generally called collet. The support 3 is substantially triangular in shape, and is threaded around the balance staff 24.

The balance spring 25 further includes means for adjusting its rigidity. For example, the adjustment means can in particular be actuated by a user when the regulating member is mounted on the plate of the horological movement.

The adjustment means include a flexible element 5 arranged in series with the strip 2, the flexible element 5 connecting one end 4, 9 of said strip 2 to a rigid support 17, and secured to one of the ends 4, 9 of the strip 2. The flexible element 5 is integral with the outer end 4 of the strip 2. The resilient element 5 is a different element from the strip 2.

The flexible element 5 adds an additional rigidity to that of the strip 2. Preferably, the flexible element 5 has a higher rigidity than that of the strip 2. The flexible element 5 is, in this case, arranged in the continuation of the strip 2. Preferably, the adjustment means and the strip 2 are made in one piece, or are even made of the same material, for example silicon.

The flexible element 5 of the balance spring 25 comprises an uncrossed flexural pivot. The pivot comprises two flexible, uncrossing blades 11, 12 and a rigid portion 18. The flexible blades 11, 12 are joined, on the one hand laterally to a rigid support 17 and, on the one hand, to the rigid portion 18 by moving towards one another. Thus, preferably, the flexible blades 11, 12 depart from one another starting from the rigid portion 18 up to the rigid support 17. The outer end 4 of the strip 2 is joined to the rigid portion 18. The rigid support 17 is unable to move relative to the plate 21. The rigid support 17 has a L-like shape, a first branch 46 of the L serving as a connection with the flexible blades 11, 12, the second branch 47 of the L being directed on the side opposite to the uncrossed pivot to enable assembly thereof to the horological movement 10.

The means for adjusting the balance spring 25 further include prestressing means 6 for applying a variable force or torque to the flexible element 5. Thus, it is possible to adjust the rigidity of the balance spring. The torque or force can be continuously adjusted by the prestressing means 6. In other words, the torque or force is not restricted to point values. Thus, it is possible to adjust the rigidity of the flexible element 5 with great accuracy.

The prestressing means 6 include a secondary flexible blade 19, arranged on an opposite side of the rigid portion 18 in the continuation of the uncrossed pivot. The secondary flexible blade 19 is disposed tangentially to the strip 2 at the outer end 4.

The secondary flexible blade 19 is connected at the other end to a curved lever 14 which runs around the strip 2. Besides the secondary flexible blade 19, the lever 14 is connected to a semi-rigid structure 27 connected to the rigid support 17. The semi-rigid structure 27 deforms in part when the lever 14 is actuated by the force or torque.

The force or torque is exerted on the free end 15 of the lever 14. Thus, the lever 14 of the prestressing means 6 transmits the force or the torque to the flexible element 5 through the secondary flexible blade 19 and the semi-rigid structure 27, so as to modify the rigidity of the balance spring 25.

In order to be able to apply the variable force or torque to the balance spring 25, the regulating member comprises a specific index-assembly system 20 according to the invention.

In the first embodiment of FIGS. 1 and 2, the index-assembly system 20 is provided with a stud-holder 31 in two portions, a first portion 32 and a second portion 33. The first portion 32 of the stud-holder 31 hangs the first stud 34, whereas a second portion 33 of the stud-holder 31 is provided with the second stud 35. The stud-holder 31 is mechanically linked to the resilient element 5, but it does not block the strip 2.

The first portion 32 of the stud-holder 31 is disposed partly above the second portion 33 of the stud-holder 31, which is in contact with the balance bridge 22. The two portions of the stud-holder 31 are held and positioned by the damper 28.

The index-assembly system 20 comprises two eccentrics 36, 37. The first eccentric 36 is mounted on the second portion 33 of the stud-holder 31 and enables the angular setting between the two portions of the stud-holder 31, which allows setting the rate.

According to the invention, the regulating member 1 further comprises locking means configured to block the second portion 33 of the stud-holder 31 in one position, herein angular, with respect to the plate 21 of the movement. The locking means comprise the second eccentric 37.

The second eccentric 37 is mounted on the balance bridge 22 and allows setting the angular position of the stud-holder 31 with respect to the plate 21, which allows setting the reference.

Thus, when mounting the index-assembly system 20, the second portion 33 of the stud-holder 31, which is movable, is positioned at first, and then it is blocked thanks to the second eccentric 37 so that it remains unable to move relative to the plate 21. Afterwards, the first portion 32 of the stud-holder 31 is positioned, then it is blocked angularly thanks to the first eccentric 36 so that it remains unable to move relative to the second portion 33. Consequently, by actuating the second eccentric 37, the entire stud-holder 31 rotates about the axis of the balance for setting the reference. To unblock and move the first portion 32, the first eccentric 36 is actuated. In this case, only the first portion 32 of the stud-holder 31 rotates about the axis of the balance, which allows moving the first stud 34 and acting on the resilient element 5 to make the rate vary.

Consequently, only the first portion 32 of the stud-holder 31 is movable relative to the balance bridge 22 after mounting, in order to be able to move the first stud 34 and act on the resilient element 5.

The two portions 32, 33 surround the second bearing 28. For this purpose, each portion 32, 33 comprises a central ring 38, 39 arranged around the second bearing 28, the two central rings 38, 39 being superimposed.

The first portion 32 comprises two protrusions 41, 42 extending radially from the central ring 38, a first protrusion 41 holding the first stud 34 downwards in the recess 26 using a first screw 74, the second protrusion 42 having a circle-arc shape cooperating with the first eccentric 36.

The second portion 33 comprises three protrusions 43, 44, 45 extending from the central ring 39. A first protrusion 43 holds the second stud 35 downwards in the recess 26 using a second screw 75, a second protrusion 44 extending around the first eccentric 36, and the third protrusion 45 having a circle-arc shape cooperating with the second eccentric 37.

In a reference arrangement, the first stud 34 and the second stud 35 are, for example, arranged substantially symmetrically relative to the staff of the balance 24.

The first stud 34 cooperates with the free end 15 of the lever 14, and the second stud 35 cooperates with the second branch 47 of the rigid support 17. In this way, the prestressing means 6 and the resilient element 5 are supported by the index-assembly system 20 from which they are suspended.

The two studs 34, 35 are arranged on either side of the prestressing means 6 and of the resilient element 5. Furthermore, the two studs 34, 35 are rigidly connected to the lever 14 and to the rigid support 17. In other words, the first 34 and the second stud 35 are respectively secured to the lever 14 by the free end 15 and to the rigid support 17 by the second branch 47. The studs and the balance spring 25 are, for example, assembled by bonding, brazing, welding, by metallic glass deformation, or by mechanical fastening.

The first stud 34 is capable of moving relative to the second stud 35. For this purpose, the first portion 32 is capable of moving relative to the second portion 33. The first portion 32 is capable of moving in rotation about the second bearing 28. Thus, the first stud 34 moves with the first portion 32, the first stud 34 being capable of moving in rotation about the second bearing 28. For example, the first stud 34 can be moved over an angular range of 20°, or of 10°.

The movement of the first stud 34 relative to the second stud 35 changes the rigidity of the resilient element 5, as the movement exerts a greater or lesser force or torque on the lever 14 of the prestressing means 6, such that the rigidity of the resilient element 5 varies, and thus the rigidity of the entire balance spring 25 varies. The index-assembly system 20 can thus be used to regulate the rate of the regulating member 1.

To this end, the index-assembly system 20 allows modifying the position of the first stud 34 with respect to the second stud 35 thanks to the circle-arc shaped second protrusion 42 of the second portion 32 and to the first eccentric 36. The circle-arc has a diameter slightly smaller than the head of the first eccentric 36, so that the movement of the first eccentric 36 causes the movement of the second protrusion 42, and therefore of the first portion 32 relative to the second portion 33 circularly around the second bearing 28, whereas the second portion 33 remains in position, when the first portion 32 is actuated. Thus, by making the first eccentric 36 rotate, the circle-arc shaped second protrusion 42 moves circularly around the second bearing 28. The first portion 32 moves relative to the second portion 33, and as a result, the first stud 34 moves relative to the second stud 35 to change the force or torque applied to the prestressing means 6 of the balance spring 25. The absence of backlash between the eccentric 36, 37 and the circle arcs 42, 45 enable a hysteresis-free setting.

Setting references 29 are disposed on the circle-arc shaped second protrusion 42 around the first eccentric 36. Thus, to set the index-assembly system 20, the first eccentric 36 is oriented according to a preferential reference.

The index-assembly system 20 is configured to adjust the rate of the regulating member 1 with a resolution lower than or equal to 1 second per day, preferably lower than or equal to 0.5 second per day, and possibly lower than or equal to 0.1 second per day. Thus, the index-assembly system 20 is calibrated so that actuation thereof enables such a resolution. The configuration of the regulating member 1 allows achieving such accuracy.

Preferably, the setting references 29 correspond to the resolution. In other words, the difference between two successive references corresponds to 1 second, 0.5 second, and possibly 0.1 second per day.

Figure 4:
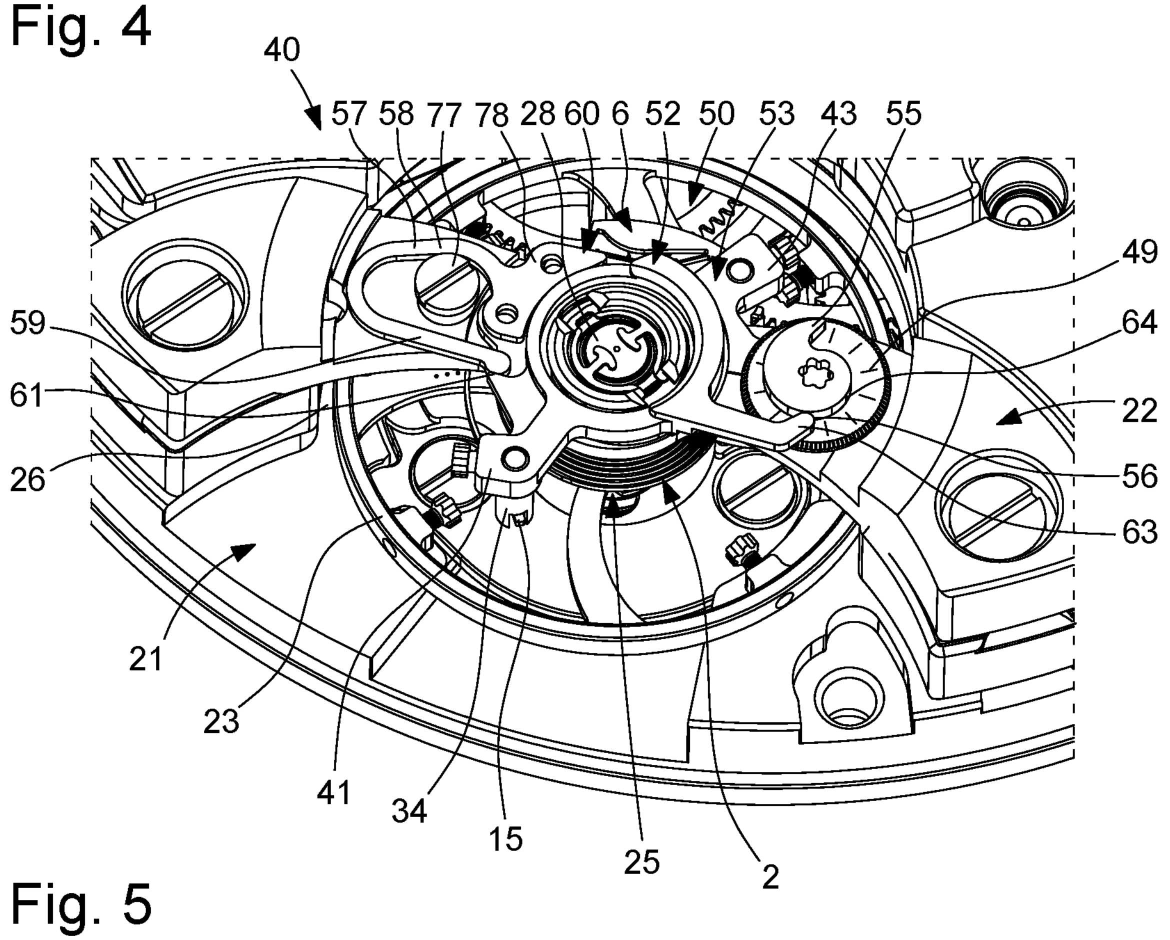
Figure 5:
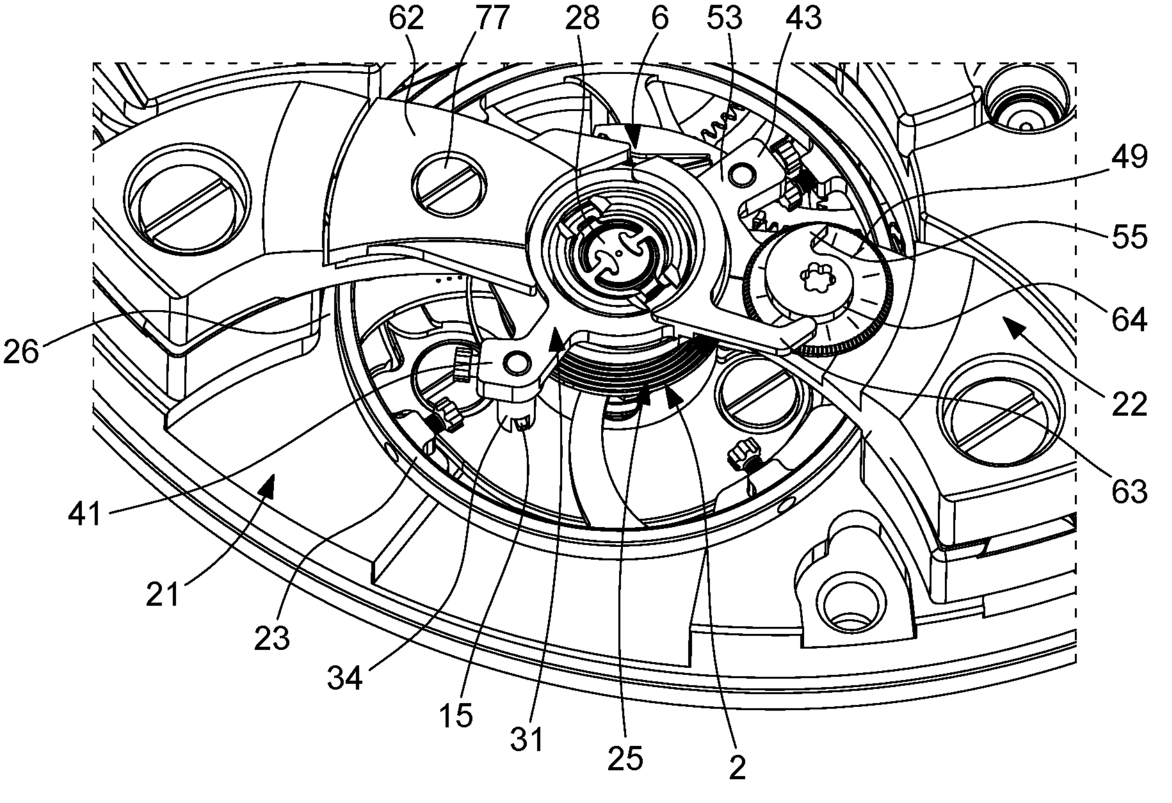

In the second embodiment of the regulating member 40 of FIGS. 4 and 5, the features of the regulating member 40 are substantially identical to the first embodiment, except for setting of the index-assembly system 60.

The first portion 52 of the index-assembly system 60 comprises an arm 63 extending radially outwards from the first portion 52 in a single plane. The second portion 53 does not comprise a circle-arc shaped protrusion.

The index-assembly system 60 includes a cam 55 movable in rotation instead of the first eccentric. The cam 55 cooperates with the arm 63 of the first portion 52 to cause it to rotate about the second bearing 28. Preferably, the end 56 of the arm 63 is constantly in contact with the cam 55, such that the rotation of the cam 55 exerts a movement on the arm 63 depending on the angular position of the cam 55. Thus, the first portion 52 of the index-assembly system 60 moves in a manner similar to that of the first embodiment. Such an index-assembly system 60 fitted with a cam 55 allows making the rigidity of the balance spring 25 varies linearly.

In order to hold the arm 63 of the first portion 52 in contact with the cam 55, the index-assembly system 60 includes a spring 57 exerting a biasing force on the first portion 52. The spring 57 is substantially U-shaped surrounding the locking screw 77, a first end 58 of the U being assembled with the second portion 53 of the index-assembly system 20, and a second end 59 of the U being retained by a retaining hook 61 arranged on the first portion 52. The spring 57 is arranged on the second portion of the stud-holder 31 symmetrically to the cam 55 relative to the second bearing 28.

Thus, the spring 57 exerts a return force on the two portions 52, 53 of the index-assembly system 60, the return force being designed to constantly hold the arm 63 of the first portion 52 in contact with the cam 55. When the cam 55 is acted upon, the first portion 52 rotates to move the first stud 34 relative to the second stud 35, while being subjected to a return force exerted by the spring 57, to allow the arm 63 of the first portion 52 to come into contact with the cam 55, in particular when the peripheral wall 64 of the cam 55 moves away from the arm 63.

The index-assembly system 60 is configured to adjust the rate of the regulating member 40 with a resolution lower than or equal to 1 second per day, preferably lower than or equal to 0.5 second per day, and possibly lower than or equal to 0.1 second per day. The configuration of the regulating member 40 allows achieving such accuracy.

According to the invention, the regulating member 40 further comprises locking means configured to block the second portion 53 of the stud-holder 51 in one position with respect to the balance 22 of the movement. The locking means comprise a locking plate 62 and a locking screw 77 for assembling the locking plate 62 on the second portion 53 and locking its position.

Preferably, the locking plate has a shape cooperating on one side with a balance bridge 72 and on the other side with the second bearing 28. The locking screw 77 crosses the locking plate 62 so as to be screwed in the balance bridge 72 disposed beneath the locking plate 62. Thus, by tightening the locking screw 77, the locking plate 62 exerts a force at least partly on the second portion 53 of the stud-holder 51, at a shoe 78 of the first end 58 of the U of the spring 57, the shoe resting on the second portion 53 of the stud-holder 51.

Thus, when mounting the index-assembly system 20, the second portion 53 of the stud-holder 51, which is movable, is positioned at first, and then it is blocked thanks to the locking plate 62 and the locking screw 77 so that it remains unable to move relative to the balance bridge 72. Only the first portion 52 remains movable relative to the balance bridge 72 after mounting, in order to be able to move the first stud 34 and act on the resilient element 5.

Setting references 49 are also disposed on the cam 55. Thus, to set the index-assembly system 60, the cam 55 is moved, for example by means of a setting button (not represented in FIGS. 4 and 5), disposed on the cam 55, and rotatable. Thus, to set the index-assembly system 60, the cam 55 is oriented according to a preferential reference.

Figure 6:
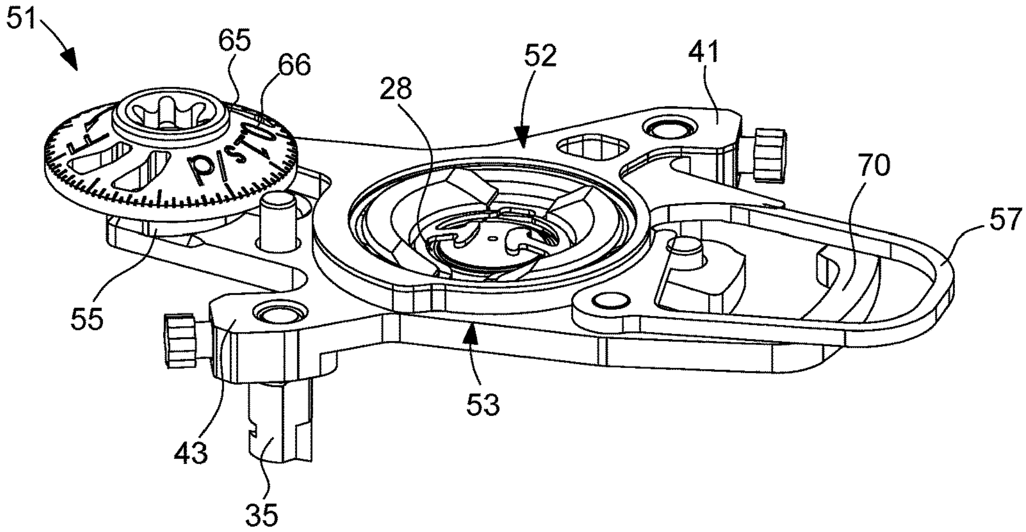

Preferably, the setting references 49 correspond to the resolution. In other words, the difference between two successive references allows modifying the rate by one second, 0.5 second, and possibly 0.1 second per day. In FIG. 6, the resolution of the setting references 49 is 0.1 second.

Figure 7:
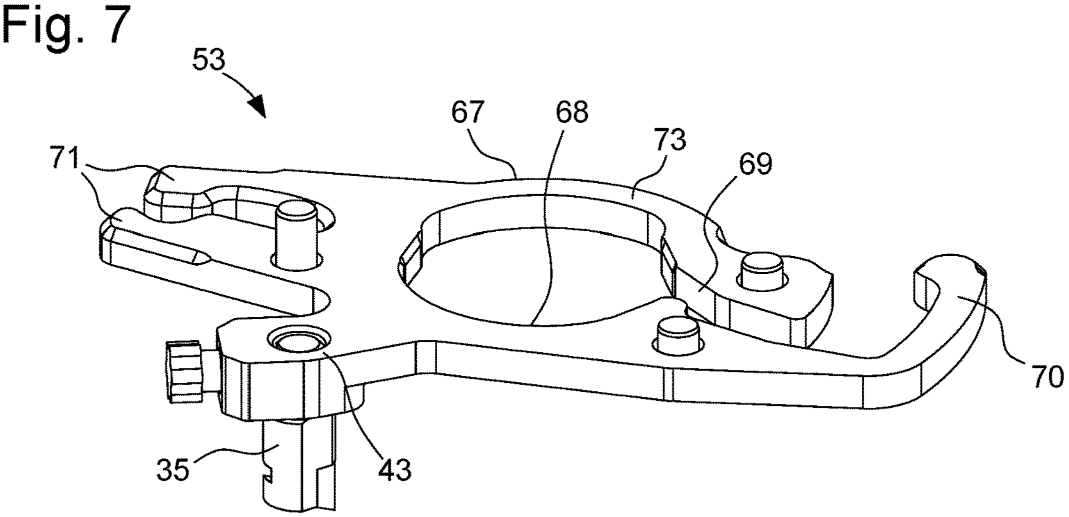

In FIGS. 6 and 7, the stud-holder 51 is a variant of the second embodiment, wherein the second portion 53 comprises on one side a bent arm 70, and on the other side a pair of pins 71, as well as a substantially circular open-through orifice 68 at the middle. The bent arm 70 is intended to cooperate with the locking plate 62. The pair of pins 71 is intended to hold the axis of the cam 55 and rest on the balance bridge 72 of the movement.

The open-through orifice 68 allows inserting a shock-absorber bearing 28 of the balance, around which the stud-holder 51 is mounted and held. The open-through orifice 68 is open by a slot 69 to confer flexibility on a segment 73 bordering the orifice 68. Thus, the bearing 28 could be fitted and held in the orifice 68. Thanks to this flexibility, the segment 73 can clear the way to insert the bearing 28 into the orifice 68, and exert a sufficient force to hold it. The shapes of the orifice 68 and of the shock-absorbing bearing 28 are configured to cooperate together, the shape of the bearing 28 preferably being slightly larger than the shape of the orifice 68.

Furthermore, the geometry of the orifice 68 allows guiding the stud-holder 51 in rotation. Indeed, the flexible segment 73 allows guiding the stud-holder 51 in rotation around the shock-absorbing bearing while preserving the concentricity of the axis of the balance (not represented in the figures).

In FIG. 6, a rotary setting button 65 is mounted on the cam 55, the button 65 including peripheral setting references 66, the setting references 66 being in accordance with the invention.

Figure 8:
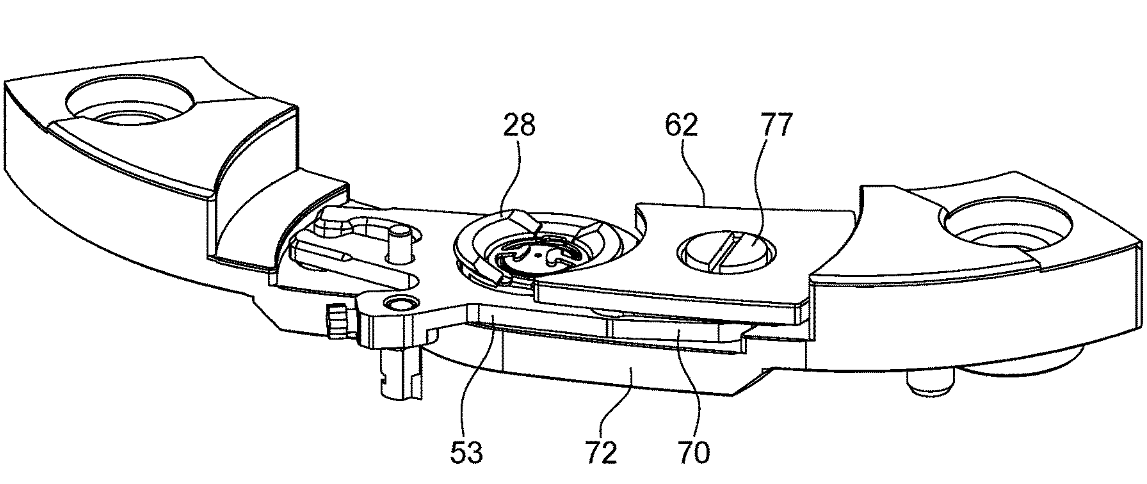

FIG. 8 shows how the locking means block the second portion 53 of the stud-holder 51 on the balance bridge 72. The locking plate 62 bears on the bent arm 70 to squeeze it against the balance bridge 72. The locking screw 77 crosses the locking plate 62 and passes through the bent arm 70 to reach the balance bridge 72 located below. Thus, the second portion 53 of the stud-holder 51 is sandwiched between the locking plate 62 and the balance bridge 72. In addition, the locking plate 62 holds the spring 57.

It goes without saying that the invention is not limited to the embodiments of regulating members described with reference to the figures and alternatives can be considered without leaving the scope of the invention.

The invention claimed is:

1. A regulating member for a horological movement comprising:

a balance, a balance spring, and an index-assembly system for adjusting a rate of the balance spring, the index-assembly system comprising a stud-holder comprising a first portion comprising a first stud and a second portion comprising a second stud, the first portion being movable relative to the second portion to be able to set a rate of the regulating member, wherein the regulating member comprises a locking device configured to block the second portion of the stud-holder in one position with respect to a plate of the movement, wherein the balance spring comprises a coiled strip and an adjustment device for adjusting a rigidity of the balance spring fitted with a resilient element arranged in series with the coiled strip, the stud-holder being mechanically linked to the resilient element, wherein the adjustment device comprises a prestressing device for applying a variable force or torque on the resilient element, and wherein the resilient element and the prestressing device are arranged between the first stud and the second stud, the first stud being movable relative to the second stud to actuate the prestressing device, a movement of the first stud modifying the rigidity of the balance spring.

2. The regulating member according to claim 1, wherein the locking device comprises an eccentric mounted on a balance bridge of the regulating member.

3. The regulating member according to claim 2, wherein the second portion comprises a protrusion having a circle-arc shape cooperating with the eccentric.

4. The regulating member according to claim 1, wherein the locking device comprises a locking plate and a locking screw for assembling the locking plate on the second portion and locking the second portion in the one position.

5. The regulating member according to claim 4, wherein the locking plate has a shape cooperating on one side with a balance bridge of the regulating member, and on an other side with a bearing of the regulating member to block the second portion.

6. The regulating member according to claim 4, wherein the locking screw is arranged so as to cross the locking plate to be screwed in a balance bridge of the regulating member.

7. The regulating member according to claim 1, wherein the index-assembly system comprises a cam and a spring, exerting a force between the first portion and the second portion to hold an arm of the first portion against the cam.

8. The regulating member according to claim 1, wherein the prestressing device includes a lever connected to the resilient element, the first stud being secured to a free end of the lever.

9. The regulating member according to claim 8, wherein the prestressing device includes a semi-rigid structure, the lever being connected to the semi-rigid structure.

10. The regulating member according to claim 1, wherein the resilient element is connected to a rigid support, the second stud being secured to the rigid support.

11. The regulating member according to claim 1, wherein the first portion and the second portion are superimposed.

12. The regulating member according to claim 1, wherein the first portion is movable in rotation relative to the second portion.

13. A horological movement, comprising the regulating member according to claim 1.

14. A timepiece, comprising the horological movement according to claim 13.

15. The timepiece according to claim 14, wherein the timepiece is a watch.

* * * * *